(12) United States Patent
Cruddace et al.

(10) Patent No.: US 10,459,086 B2
(45) Date of Patent: Oct. 29, 2019

(54) SATELLITE POSITIONING SYSTEM AUTHENTICATION METHOD AND SYSTEM

(71) Applicant: Ordnance Survey Limited, Southampton, Hampshire (GB)

(72) Inventors: Paul Cruddace, Southampton (GB); Stephen Hancock, Southampton (GB)

(73) Assignee: Ordnance Survey Limited, Southampton, Hampshire (GB)

( * ) Notice: Subject to any disclaimer, the term of this patent is extended or adjusted under 35 U.S.C. 154(b) by 337 days.

(21) Appl. No.: 15/587,838

(22) Filed: May 5, 2017

(65) Prior Publication Data
US 2017/0329016 A1    Nov. 16, 2017

(30) Foreign Application Priority Data
May 13, 2016  (GB) .................................... 1608443.6

(51) Int. Cl.
*G01S 19/21*   (2010.01)
*G01S 19/07*   (2010.01)
*G01S 19/03*   (2010.01)

(52) U.S. Cl.
CPC ............ *G01S 19/215* (2013.01); *G01S 19/03* (2013.01); *G01S 19/07* (2013.01)

(58) Field of Classification Search
CPC ........ G01S 19/215; G01S 19/03; G01S 19/07; G01S 19/41; G01S 19/20; G01S 19/08; G01S 5/009
USPC .................................................. 342/357.44
See application file for complete search history.

(56) References Cited

U.S. PATENT DOCUMENTS

| 5,563,607 | A | 10/1996 | Loomis et al. | |
|---|---|---|---|---|
| 6,111,541 | A | 8/2000 | Karmel | |
| 6,324,473 | B1 | 11/2001 | Eschenbach | |
| 2005/0146459 | A1 | 7/2005 | Dentinger et al. | |
| 2016/0178752 | A1* | 6/2016 | Davies | G01S 19/20 342/357.58 |
| 2016/0191173 | A1* | 6/2016 | Malaney | H04L 9/0852 455/899 |

(Continued)

FOREIGN PATENT DOCUMENTS

| EP | 2680037 A1 | 1/2014 |
|---|---|---|
| EP | 2799908 A1 | 11/2014 |
| WO | 2012007720 A1 | 1/2012 |

OTHER PUBLICATIONS

Abousalem, Mohamed, et al., "DGPS Positioning Using WAAS and EGNOS Corrections," ION GPS 2000, Sep. 19-22, 2000, Salt Lake City, UT, www.magellangps.com.

(Continued)

Primary Examiner — Harry K Liu
(74) Attorney, Agent, or Firm — Banner & Witcoff, Ltd.

(57) ABSTRACT

Embodiments of the invention provide that when performing a position fix a user who makes use of RTK or dGNSS correction data from a RTK/dGNSS service to obtain more accurate position fixes also receives from that same service data derived from the encrypted GNSS channels that authenticates whether the position fix determined by the mobile terminal based on the RTK/dGNSS data can be relied upon. By providing such an integrated service the mobile user terminal is able to obtain an authenticated, highly accurate positional fix which it can be certain can be relied upon.

24 Claims, 5 Drawing Sheets

(56) References Cited

U.S. PATENT DOCUMENTS

2016/0259061 A1* 9/2016 Carter .................... G01S 19/05

OTHER PUBLICATIONS

Schielin, Emmanuel, "On the Foundation of GNSS Authentication Mechanisms," 25th International Technical Meeting of the Satellite Division of the Institute of Navigation, Nashville, TN, Sep. 17-21, 2012.
Turner, Michael, et al., "PROSPA: Open Service Authentication," Proceedings of the 26th International Technical Meeting of the Ion Satellite Division, ION GNSS+2013, Nashville, TN, Sep. 16-20, 2013.
Oct. 26, 2017—(EP) Extended Search Report—App No. 17170408.3.
Sep. 12, 2016—(EP) Search Report—App 1608443.6.

* cited by examiner

SATELLITE POSITIONING SYSTEM AUTHENTICATION METHOD AND SYSTEM

TECHNICAL FIELD

Embodiments of the present invention relate to a method and system for authenticating a position fix obtained via open signals from a Satellite Positioning System (SPS) such as a Global Navigation Satellite System (GNSS) using encrypted SPS positioning signals. However, the position fix is a corrected fix which has been corrected to give a more accurate location, using position correction data from surveyed receiver stations the precise locations of which are known, and hence embodiments of the invention are able to provide corrected position fixes (for example using real-time kinematic (RTK) or differential GNSS (dGNSS) correction systems), which are then authenticated using the restricted encrypted positioning signals in the SPS signal, for example such as the Public Regulated Service (PRS) signal in the Galileo GNSS system.

BACKGROUND TO THE INVENTION AND PRIOR ART

Satellite Positioning Systems (SPS) are used in many areas, such as providing accurate timing, as well as accurate navigation and positioning for vehicles such as aircraft, cars, ships, and the like. Satellite Positioning systems can be classified as either a Global Navigation Satellite System (GNSS), such as the Global Positioning System (GPS), the Galileo system, the GLONASS system, and the Beidou system which provide global coverage, or as a regional system which just provides regional coverage, such as the Indian Regional Navigation Satellite System or IRNSS with an operational name of NAVIC (Sailor or Navigator in Hindi) system. In this description, however, we often use the term GNSS to refer to any satellite positioning system, whether global or regional, unless the context clearly requires otherwise, and hence the terms Satellite Positioning System (SPS) and Global Navigation Satellite System (GNSS) are often used herein interchangeably.

Whilst many GNSS/SPS systems will provide native accuracy of a few meters, improved accuracy can be obtained by using differential techniques which make use of a surveyed reference GNSS receiver, which compares the position obtained by its GNSS receiver to its known surveyed position, and then broadcasts position correction data to other ground stations, which then use the position correction data in combination with their own position fixes from the GNSS system in order to obtain a more accurate position fix. Such dGNSS systems (referred to herein more generally as dSPS systems to also include where the SPS is a regional system) often have only a single surveyed reference station, and the accuracy of the position fixes obtained by the rover stations decreases with distance from the fixed survey station.

More recently, networks of surveyed reference GNSS receiver stations have been installed across geographical regions. For example, in the UK the "OS Net" network of precisely located GNSS receiver stations provides a national network of reference GNSS stations which can be used to improve the accuracy of position fixes of other mobile stations. In practice, the reference stations at the precisely surveyed geographic locations may use real time kinematic (RTK) satellite navigation techniques, where the phase of the GNSS signal's carrier wave is measured, thereby allowing highly accurate positioning, typically to one to two centimetres accuracy. FIG. 1 illustrates such a network of reference stations, wherein a plurality of reference stations 12 are distributed across a geographic region 1, at precisely surveyed and known geographic locations. The reference stations 12 may use dGNSS or RTK techniques to obtain position fixes, which fixes are then fed back to a central server 30, which collates the position fix data from each reference station 12, and compares it to the known geographic location of each reference station 12, to thereby allow position fix correction data to be computed. A mobile station 20 typically subscribes to a service which allows access to the position fix correction data calculated by the network RTK server 30, and when it is undertaking a position fix, it contacts the network RTK server 30, and receives the position fix correction data. The position fix correction data is then used by the mobile terminal 20 to improve the accuracy of its own position fix that it takes using signals transmitted by the constellation of GNSS satellite 10. The GNSS satellite constellation 10 may be any of satellites belonging to the Galileo, GPS, or GLONASS GNSS, or Beidou or instead of being global may be any of the other regional SPS constellations, such as IRNSS.

With such an arrangement, accurate positioning across the geographical area 1 can be obtained, to sub-meter, centimetre, or even subcentimetre accuracy, depending on the length of time observed and the capability of the user's GNSS equipment. Such accuracy can be very important for surveying applications, as well as for machinery control (e.g. farm machinery), Unmanned Aerial Vehicle operations, asset tracking, and the like.

Another issue that arises in the use of GNSS systems is whether or not accurate GNSS signals are being received, such that an accurate position fix can be obtained therefrom. In this respect, GNSS signals can be subject to spoofing and jamming, in order to introduce errors into position fixes obtained therefrom. In order to address this problem, several different solutions have been proposed previously, two of which are shown respectively in FIGS. 2 and 3. These are both described next.

Within GNSS systems it is common for there to be an encrypted channel for government and military use, which is heavily encrypted and therefore resistant to jamming and spoofing thereof. However, because the channel is heavily encrypted, hardware security modules are required at the receiver that contain decryption key material therein. Such hardware security modules are cryptographic controlled items, which are not freely available to the public. However, by decrypting the encrypted navigation channels in GNSS systems, it is possible to authenticate a position fix obtained from the open channels. It would therefore be useful for such authentication techniques using the encrypted navigation channels to be more widely available, without compromising the cryptographic controlled items such as the hardware security modules which contain the decryption key material. Two previous approaches in relation to the Galileo public regulated service (PRS), which is the government authorised-user service which makes use of cryptographically generated navigation signals, and which can be decrypted via security controlled hardware security modules, are described next.

Both FIGS. 2 and 3 present server-based Galileo PRS services, where the PRS decryption key is held securely by a government trusted party, which provides a decryption and authentication service to public users. FIG. 2 illustrates a first system, referred to as the ASPIRE (Affordable Secured PURSUIT PRS Integrated REceivers) system, which is described in further detail in WO2012/007720 in the name of Thales UK. In this system, a mobile unit 20 receives GNSS signals from the GNSS constellation 10, in this case the Galileo constellation. The mobile station 20 then performs a position fix based on the received signals, and at the same time the open service GNSS as well as Galileo PRS signals RF signals are captured, screened and conditioned before forwarding to a remote server for processing. The open service and encrypted PRS signals are then transmitted to a PRS decryption server 42, which is located at a government-trusted third party 40. The PRS decryption server 42 has access to the PRS decryption key 44, and is able to decrypt the received PRS signals from the mobile station 20, and authenticate them to confirm that they are genuine. Authentication of the open service signal against the PRS signal is completed and an authentication signal is then transmitted back to the mobile station 20, to confirm that the received PRS signals that were sent from the mobile station 20 to the PRS decryption server 42 are genuine. This operation gives the mobile station 20 comfort that if the PRS signals have not been tampered with, or spoofed, and hence are genuine, then it is likely that the open signals upon which it has based its position fix are also likely to be genuine, and hence the position fix can be relied upon.

In the above, it is only necessary for the mobile station 20 to demodulate and record the PRS signal from one satellite 10 in the Galileo constellation, as provided that a single PRS signal can be decrypted, then the position fix using the open Galileo signals can be authenticated. However, it is also possible that multiple PRS signals from the Galileo constellation in view could be recorded, in which case those signals can all be transmitted to the server 42 via the mobile station 20, where they are then decrypted and, because there are plural such signals, a PRS based position fix can then be obtained. This PRS based position fix can then also be communicated back to the mobile station 20. Thus, the ASPIRE system allows a mobile station 20 to either authenticate its own position fix based upon the open Galileo signals using the PRS signals as sent to a trusted decryption server, or for a PRS position fix to be obtained, where the mobile station 20 records and forwards multiple PRS signals from multiple satellites in the Galileo constellation to the trusted decryption server. In both instances, however, the PRS decryption key 44 is kept securely with the trusted party 40, and is not exposed to the mobile station user 20.

FIG. 3 illustrates a further prior art system, known as the PROSPA (PRs/Open Service Positioning and Authentication) system. Further details of the PROSPA system are available in EP2799908A1, owned by Nottingham Scientific Limited. The PROSPA system is a broadcast system that transmits a so-called "snippet message" for a given point in time to mobile subscriber terminals 20. The snippet message contains enough data to permit the mobile terminals 20 to correlate the GNSS encyrpted signals at that time. Snippet messages are broadcast to user terminals via a secure communications channel and once received, the snippet allows the mobile terminals 20 to correlate at least part of the received PRS signal with the result that if the PRS signal can be correlated, it is then known that the signals have not been tampered with, and hence the fix obtained from the Galileo open signal can be authenticated. The PROSPA system therefore requires less messaging than the ASPIRE system, in that it is a broadcast system wherein the snippet message is broadcast to subscriber terminals and then used at this subscriber terminal for PRS correlation, but it does require additional processing to be performed at the subscriber terminal, and hence the subscriber terminal 20 has to be more complex than the terminal 20 used in the ASPIRE system. In addition, there is also the need for a secure channel between the snippet generator 52 and the mobile terminals 20 over which the snippet message can be passed.

SUMMARY OF THE INVENTION

Embodiments of the invention provide that when performing a position fix a user who makes use of RTK or dSPS (e.g. dGNSS) correction data from a RTK/dSPS service to obtain more accurate position fixes also receives from that same service data derived from the encrypted SPS channels that authenticates whether the position fix determined by the mobile terminal based on the RTK/dSPS data can be relied upon. By providing such an integrated service the mobile user terminal is able to obtain an authenticated, highly accurate positional fix which it can be certain can be relied upon.

In one embodiment the mobile user terminal monitors the encrypted SPS signal channel when performing a position fix and sends back to the network server from which it received RTK/dSPS correction data the encrypted demodulated SPS signal that it has received, together with its position as calculated using the open signal. The server then decrypts the received encrypted SPS signal itself, or forwards the received PRS data to a trusted third party server for decryption, and a check is then made as to whether decrypted secure SPS signal correlates correctly with the expected values, on the assumption that if it decrypts properly and checks out, then the open signal is probably authentic as well. If the received secure SPS data is determined to be authentic, then a 'SPS AUTHENTICATED' flag is then returned to the user. Hence, the user ends up with an accurate RTK/dSPS corrected position based on the open service, but which has been further authenticated using the encrypted SPS signal.

In another embodiment the server or a trusted third party server generates a snippet message, containing sufficient of the SPS secure channel codes to allow a mobile terminal to correlate at least part of the secure SPS channel, to thereby determine whether the received signals are being interfered with. The snippet message is provided to the mobile receiver with the RTK/dSPS data, thus allowing the mobile receiver to undertake an accurate corrected position fix using the RTK/dSPS correction data, and at the same time correlate the secure encrypted SPS channels using the snippet. Provided the receiver is able to perform the correlation of the secure channel then it knows that the signal is authentic, and hence the position fix obtained from the open channels can then be relied upon, In view of the above, from a first aspect there is provided a method of authenticating a SPS position fix in a mobile SPS receiver, the method comprising: i) receiving at the mobile SPS receiver position fix correction data derived from one or more reference SPS receivers; ii) determining a position fix of the mobile SPS receiver using unencrypted open SPS channels transmitted from satellites of the SPS; the method being characterised in that the mobile SPS receiver further receives authentication data relating to one or more encrypted SPS channels that authenticates or may be used to authenticate the determined position fix without the mobile SPS receiver having to fully decrypt the encrypted SPS channels. As such, integrated authentication and increased accuracy can be obtained.

Within the above, the mobile SPS receiver is not provided with the encrypted SPS channels decryption key. As such, security of the encrypted channel is not compromised.

Preferably the authentication data and the position fix correction data are received at the mobile SPS receiver from the same server. This helps to provide an integrated service to the end users.

In one embodiment the method further comprises: a) receiving and sampling the one or more encrypted SPS channels; b) forwarding the sampled encrypted SPS channels data to a decryption server; c) receiving an authentication signal from the decryption server as the authentication data in the event that the decryption server was able to authenticate the encrypted SPS channels data; wherein if the encrypted SPS channel data received by the mobile SPS receiver has been authenticated, the mobile SPS receiver may then treat the unencrypted open channel data as authentic.

Alternatively, in another embodiment, the method further comprises: a) receiving a snippet message that contains data relating to a portion of the encrypted SPS channel decryption codes; b) using the received snippet message data to correlate at least part of the encrypted SPS channels, and c) authenticate the open channels in dependence on the correlation of the encrypted SPS channels using the snippet message data; wherein if the encrypted SPS channel data received by the mobile SPS receiver has been authenticated, the mobile SPS receiver may then treat the unencrypted open channel data as authentic.

From another aspect there is also provided a method for use in authenticating a SPS position fix of a mobile SPS receiver, the method comprising: i) receiving SPS position fix data from one or more reference SPS receivers; ii) determining position fix correction data in dependence on the received position fix data; and iii) transmitting to the mobile SPS receiver the position fix correction data; the method being characterised by further comprising: iv) transmitting to the mobile SPS receiver authentication data relating to one or more encrypted secure SPS channels that authenticates or may be used to authenticate a position fix determined by the mobile SPS receiver without the mobile SPS receiver having to fully decrypt the encrypted secure SPS channels.

In one embodiment the authentication data and the position fix correction data are transmitted to the mobile SPS receiver from the same server. This helps to provide an integrated service.

In one embodiment the method further comprises: a) receiving sampled encrypted SPS channels data from the mobile SPS receiver; b) decrypting the encrypted secure SPS channels data; c) authenticating the decrypted secure SPS channels data; and d) sending an authentication signal to the mobile SPS receiver as the authentication data in the event that the decrypted secure SPS channels data was authenticated.

In another embodiment the method further comprises: a) generating a snippet message that contains data relating to a portion of the encrypted SPS channel decryption codes; and b) transmitting the snippet message to the mobile SPS receiver as the authentication data.

In many of the embodiments the satellite positioning system (SPS) used in the above methods is a Global Navigation Satellite System (GNSS), such as the GPS system, Beidou system, Galileo system, or GLONASS system. In other embodiments, however, a regional SPS may be used, like the IRNSS or QZSS system.

In one preferred embodiment the satellite positioning system (SPS) is the Galileo GNSS system, and the encrypted secure SPS channels are the Galileo Public Regulated Service (PRS) channels.

Further aspect of the invention also provide a method for authenticating a satellite positioning system (SPS) position fix obtained by a mobile SPS receiver, comprising using real time kinetic (RTK) or differential SPS (dSPS) correction data from a RTK/dSPS service to obtain a SPS position fix of improved accuracy than otherwise, and receiving from that same service data derived from or relating to encrypted SPS channels that the mobile SPS receiver cannot decrypt that authenticates whether the position fix determined by the mobile terminal based on the RTK/dSPS data can be relied upon.

In addition, there is also provided a method for use in authenticating a satellite positioning system (SPS) position fix obtained by a mobile SPS receiver, comprising providing real time kinetic (RTK) or differential SPS (dSPS) correction data from a RTK/dSPS service to allow the mobile SPS receiver to obtain a SPS position fix of improved accuracy than otherwise, and providing as part of the same service data derived from or relating to encrypted SPS channels that the mobile SPS receiver cannot decrypt that authenticates whether the position fix determined by the mobile terminal based on the RTK/dSPS data can be relied upon.

Further features of embodiments of the invention will be apparent from the appended claims.

BRIEF DESCRIPTION OF THE DRAWINGS

Embodiments of the invention will now be further described by way of example only and with reference to the accompanying drawings, wherein like reference numerals refer to like parts, and wherein.

DESCRIPTION OF THE EMBODIMENTS

Embodiments of the invention will now be described with respect to FIGS. 4 and 5. As mentioned above, embodiments of the invention may be used with any satellite positioning system, whether global or regional, although the embodiments described below are particularly envisaged for use with GNSS, such as the Galileo system. However, the skilled reader should understand that where reference is made to a GNSS then that can also include a regional SPS such as the IRNSS system.

In particular, embodiments of the invention integrate together the dGNSS/RTK based systems that provided for improved positioning fix accuracy based on GNSS open channels with the signal authentication systems based on the restricted access encrypted GNSS channels, to provide a service that provides for authenticated, highly accurate positioning to be obtained.

In more detail, embodiments of the invention allow a mobile user receiver the position of which the user desires to fix to make use of an existing network of accurately surveyed and placed GNSS receiver stations to undertake differential positioning or RTK based positioning to obtain an accurate (~1-2 cm) position fix. In addition, in order to ensure the accuracy of the fix the mobile receiver also makes use of a secure encrypted GNSS channel, such as the PRS channel in a Galileo signal, to authenticate the obtained fix, either by either correlating the channel using a part of the decryption key to thereby authenticate the received signals, or by sampling the PRS channel during the position fix and sending the PRS samples to a trusted third party server which has access to the decryption key, to allow the third party server to authenticate the received encrypted signal, and report the authentication back to the user receiver. In either method, what is obtained is a position fix of increased accuracy when compared to a stand-alone position fix (i.e. a fix obtained by a stand-alone GNSS receiver without making use of any dGNSS or RTK service), which is also authenticated as being correct by virtue of the encrypted channel authentication.

In view of the above, two embodiments of the invention will now be described, the first embodiment relating to authenticating a dGNSS/RTK assisted position fix by sampling the encrypted channel and sending the samples to a trusted third party server for decryption and authentication, and the second embodiment performing authentication at the mobile user device, based on broadcast "snippets" of the encrypted GNSS channel (such as the PRS channel in Galileo) which allow the user device to calculate authenticated position, velocity, and time (PVT) data.

Figure 1:
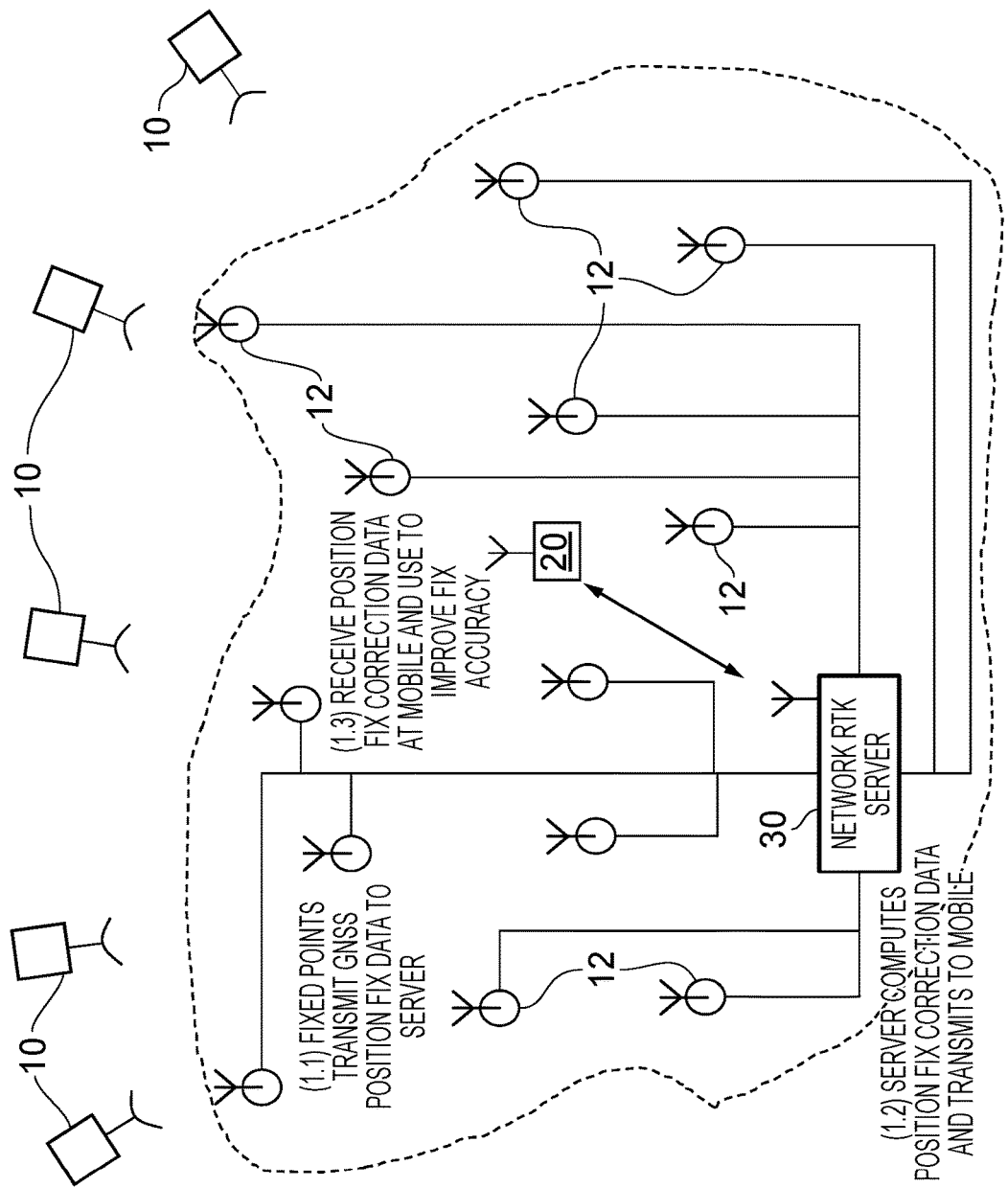
FIG. 1 is a diagram illustrating a dGNSS/RTK system of the prior art.
Figure 2:
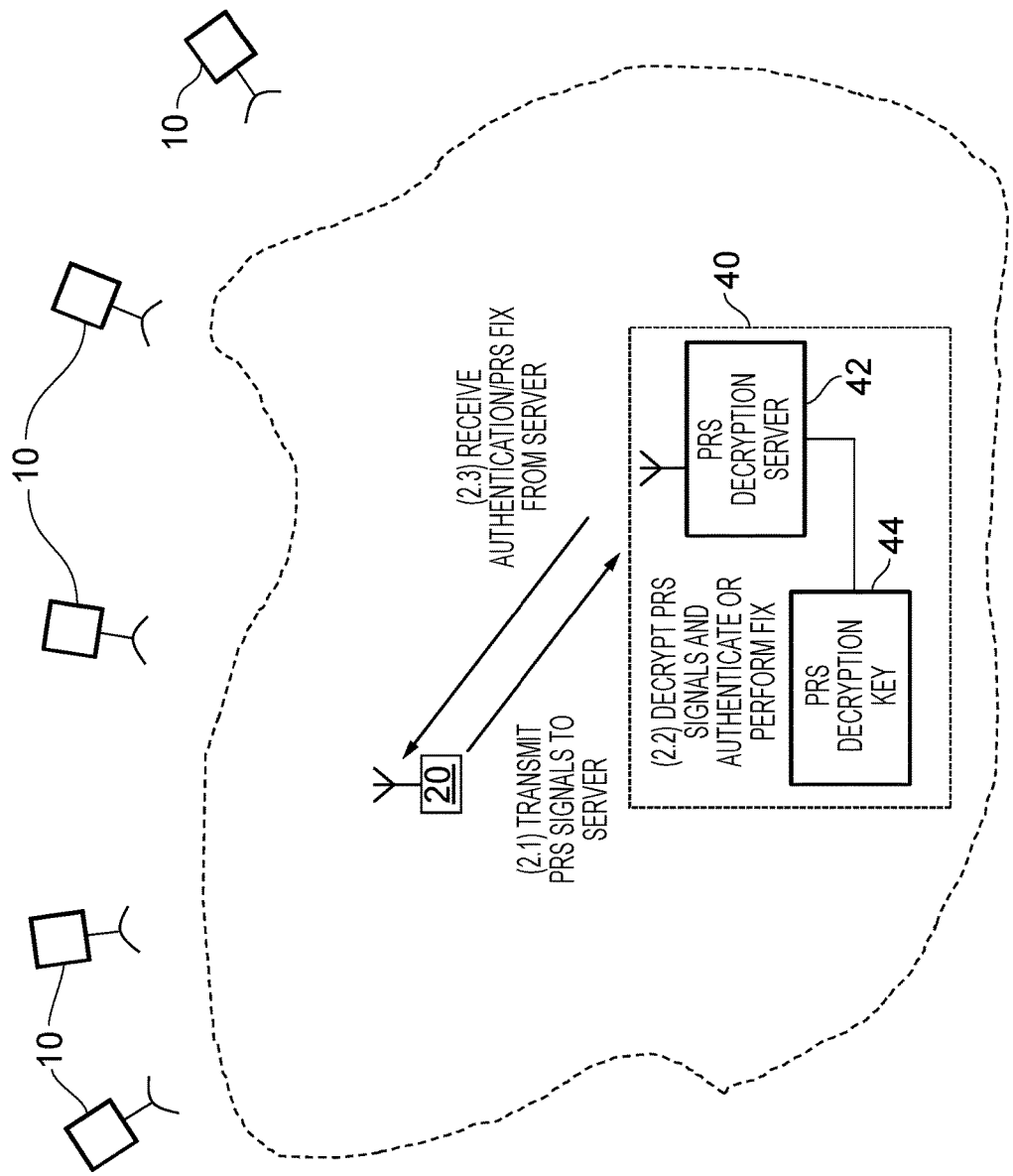
FIG. 2 is a diagram illustrating the ASPIRE GNSS authentication system of the prior art.
Figure 3:
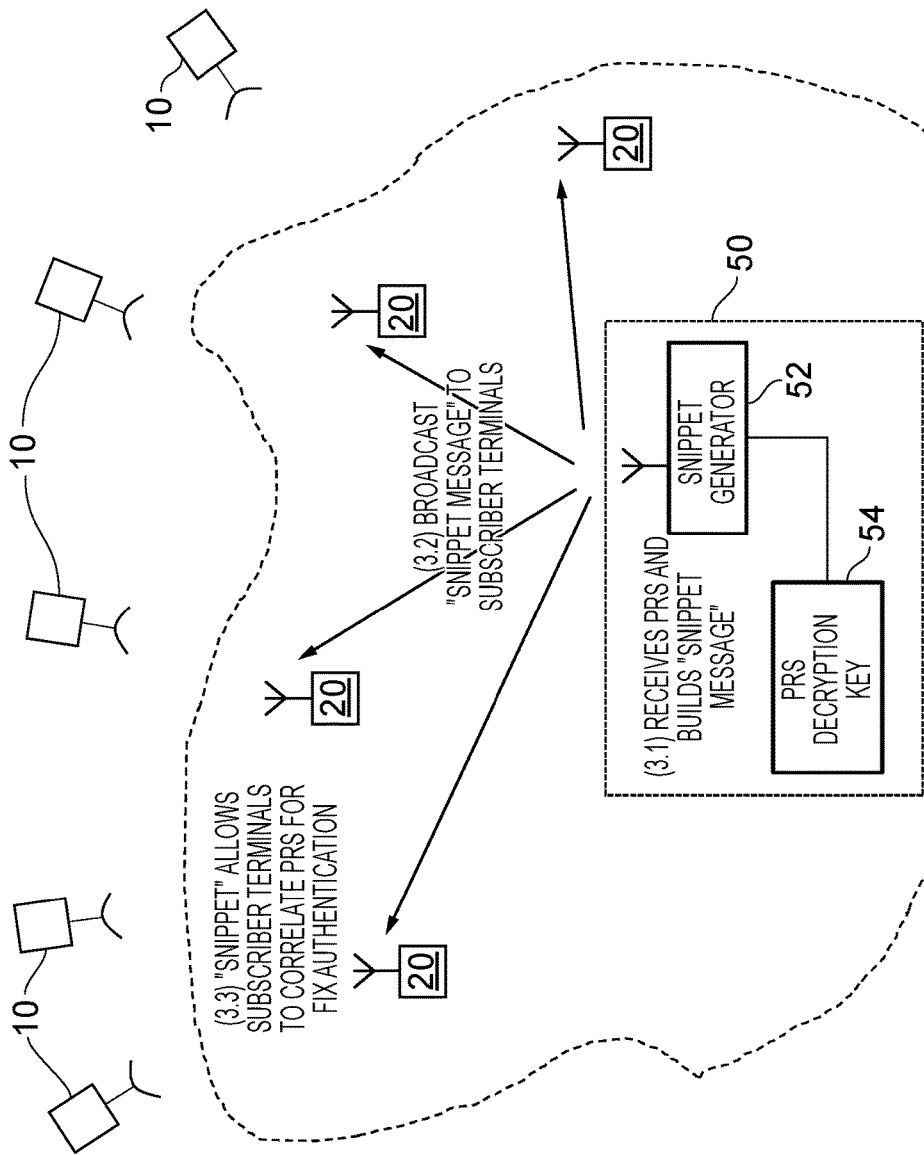
FIG. 3 is a diagram illustrating the PROSPA GNSS authentication system of the prior art.
Figure 4:
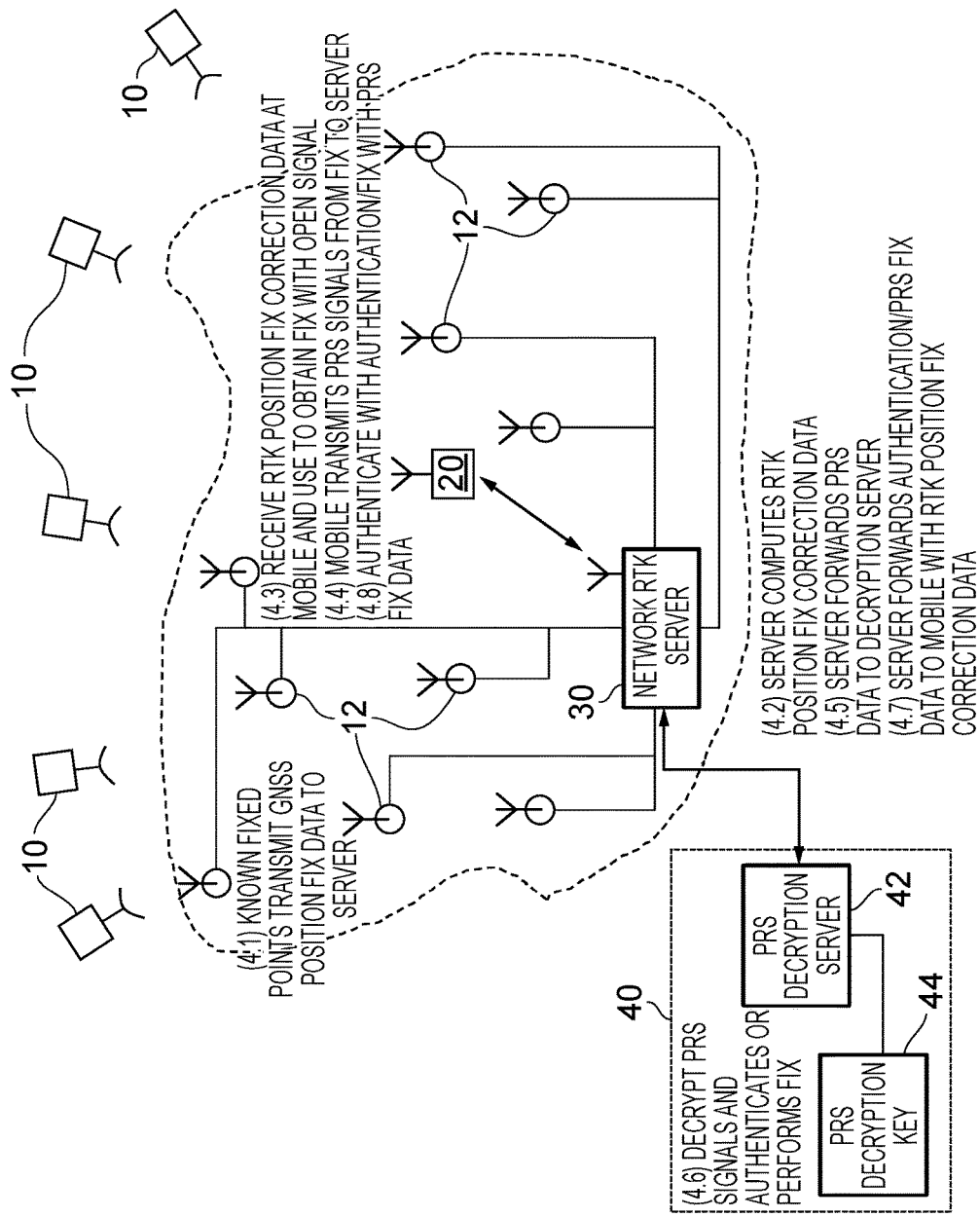
FIG. 4 is a diagram illustrating a first embodiment of the invention.
Figure 5:
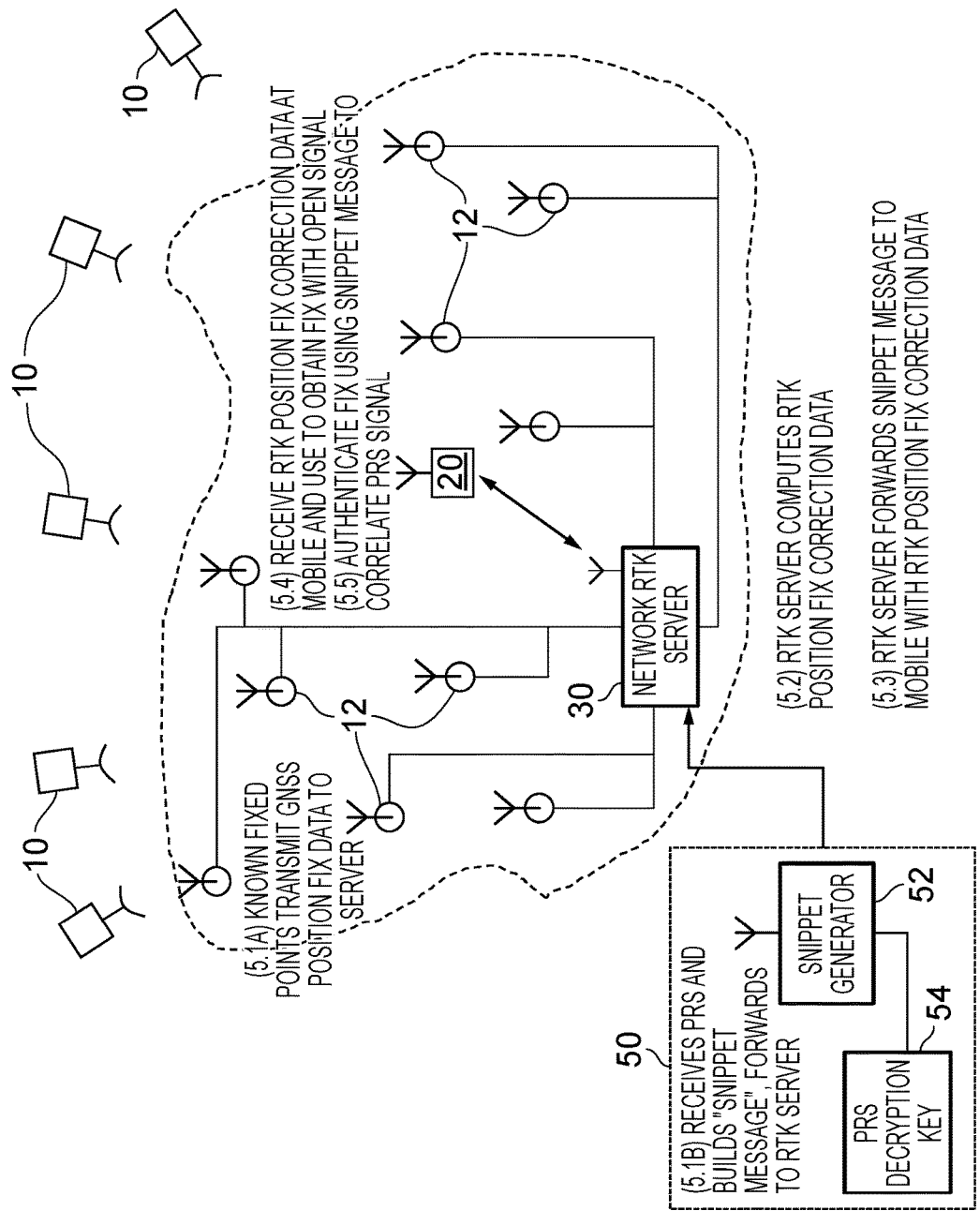
FIG. 5 is a diagram illustrating a second embodiment of the invention.

FIG. 4 illustrates the first embodiment of the invention. Here a GNSS satellite constellation 10 is provided, such as the Galileo constellation, or GPS constellation. Within a geographic area 1 (which may be an individual country or state, or part of or a whole continent) a plurality of reference GNSS receivers 12 are provided, each of which are at precisely surveyed known locations. The GNSS reference receivers 12 are connected via appropriate network connections to a server 30, and send to the server 30 (at s.4.1) position fix data and other data (such as GNSS signal carrier phase information) to enable the server 30 to compute dGNSS or RTK position fix correction data (at s.4.2). The dGNSS or RTK position fix correction data is then sent to the subscribing mobile terminals 20, to allow them to use the correction data to make more accurate position fixes. Thus far, this operation corresponds to that of a standard RTK or dGNSS correction system, such as, for example, those which make use of data from the OS Net™ system from Ordnance Survey Limited (being a network of position surveyed, GNSS reference receivers owned and operated by Ordnance Survey Limited) which RTK services include SmartNet™ from Leica GeoSystems, VRS Now™ from Trimble, TopNETlive™ from Topcon, and Farm-RTK™ by Axio-Net, by way of example.

When making a position fix, however, in the present embodiment the mobile terminal 20 demodulates and saves the encrypted GNSS channel, in addition to the open channels upon which it bases its position fix. For example, where the GNSS system is the Galileo system, the mobile terminal 20 records the PRS signals. The saved encrypted GNSS channel data is then sent, via a suitable data connection, to the server 30 (at s.4.4) which then forwards (at s.4.5) the received PRS data to a decryption server 42, located at a government trusted third party 40. In this respect, both the server 30 and the PRS decryption server 42 can be operated by the same government trusted third party.

The mobile terminal 20 may receive the PRS signal from only a single GNSS satellite, in which case there is not enough data to perform a position fix using the PRS data alone, or may receive PRS signals from multiple satellites sufficient to perform a position fix based on the plural PRS signals. In either case whichever PRS data is received may be forwarded to the server 30 for forwarding to the PRS decryption server 42.

Once the decryption server 42 has received the PRS data, it then decrypts the PRS data using the PRS decryption key 44 held by it, and then examines the decrypted PRS data to determine whether it is authentic (s.4.6). If it is authentic, the PRS decryption server then sends an authentication message to the server 30 confirming the authentication, and the server 30 forwards the authentication message to the mobile device 20 (at s.4.7). This is received at the mobile device 20 at s.4.8, after which the mobile device can then be confident that the position fix that it made with the open Galileo signal at s.4.3 can be considered authenticated, by virtue of the fact that the PRS signal that it sampled and sent to the network server 30 was authenticated as being correct.

Additionally or alternatively, if the decryption server 42 has received sufficient samples of PRS signals from different satellites to perform a position fix based on the PRS data, then such a fix is calculated, and that fix data can then forwarded to the user terminal via the network server 30. The mobile terminals 20 can then either rely on the PRS position fix directly, or compare it to the position fix it obtained from the open channels, to thereby authenticate the open channel position fix, provided the two fixes are within an acceptable distance of each other.

With the above arrangements, therefore, it becomes possible for a mobile terminal 20 to obtain highly accurate dGNSS/RTK position fixes which are authenticated as correct via an integrated service. From the mobile terminal point of view it communicates with the network server 30 for both the dGNSS/RTK data and the authentication data in a single integrated transaction, with the result that authenticated and accurate position fixes can be obtained.

The second embodiment of the invention will now be described with respect to FIG. 5. The second embodiment is based upon providing authentication using the snippet message based technique to transmit portions of the encrypted channel spreading codes to allow the mobile terminals 20 to correlate at least part of the encrypted channel, to thereby authenticate the open channels. With such an arrangement the mobile terminals can authenticate themselves whether the received open signal is genuine, based upon their correlation of the part of the encrypted channel, but without providing full access to the encrypted channel. That is, the snippet messages do not permit full decryption of the encrypted channel such that a mobile terminal would then be able to use the encrypted channel for position fixing, but provide the mobile terminal with sufficient data to allow at least partial correlation of the encrypted channel suffice to determine whether it is being interfered with.

In view of the above, in FIG. 5 again a GNSS satellite constellation 10 is provided, such as the Galileo constellation, or GPS constellation. Within the geographic area 1 (which may be an individual country or state, or part of or a whole continent) the plurality of reference GNSS receivers 12 are provided, each of which are at precisely surveyed known locations. The GNSS reference receivers 12 are connected via appropriate network connections to the server 30, and send to the server 30 (at s.5.1A) position fix data and other data (such as GNSS signal carrier phase information) to enable the server 30 to compute dGNSS or RTK position fix correction data (at s.5.2).

At the same time as the above a snippet message generator 52 located at a government trusted third party 50 listens to the PRS channels broadcast by the satellite constellation 10 and uses the PRS decryption key 54 to decrypt the PRS channels. The snippet generator 52 then uses decrypted PRS channels to build a "snippet" message for a given point in time at s.5.1B. A snippet is a sequence of the PRS signals data truncated in time and multiplexed for several satellites and permits the mobile receivers 20 to correlate the satellites PRS signals at that time. Snippets can be built for different qualities of service to match different application requirements or capability rights. The coverage area of a snippet depends on it including the satellites in view at the receiver location and it is often in the range of hundreds of kilometres permitting a single snippet to provide coverage over the entire geographic area of interest 1. The generated snippet messages are then forwarded to the dGNSS/RTK server 30, for broadcast on to the mobile terminals 20.

At the network server 30 dGNSS or RTK position fix correction data is computed (at s.5.2) in the same manner as known in the art, and the dGNSS or RTK position fix correction data is then sent to the subscribing mobile terminals 20, to allow them to use the correction data to make more accurate position fixes. In addition, with the position fix correction data the most recent snippet message received from the snippet generator is also included, such that the mobile terminal 20 receives the snippet message with the RTK/dGNSS position fix correction data (s.5.3). In this respect, this operation differs from the prior art PROSPA system, which envisages the snippets being broadcast to the mobile terminals 20, whereas in the present embodiment the snippets are sent on a per mobile terminal basis with the specific RTK/dGNSS position fix correction data from the RTK/dGNSS system.

At the mobile terminal 20 at s.5.4 the received RTK/dGNSS correction data is used to obtain an accurate position fix using the GNSS open channels, and at the same time the GNSS encrypted channels (PRS in the case of Galileo) are correlated using the data in the received snippet message, to thereby authenticate all of the received signals, including the open signal upon which the position fix is based.

With such an arrangement, therefore, again an integrated system that permits both high accuracy RTK/dGNSS position fixes to be obtained with built in authentication is provided. Compared to the first embodiment the bandwidth requirements of the second embodiment are less, as there is no need for the mobile terminal to send the sampled encrypted signals over the air to the back-end decryption server, but conversely as a consequence, because the user terminal has to decrypt and/or correlate the encrypted signals the mobile terminal 20 of the second embodiment will likely need to be of more complex design. There are thus different advantages to both embodiments.

Various modifications may be made to the above embodiments to provide further embodiments. For example, within the above we have made reference to there being a single network RTK server 30, or a single PRS Decryption server 42, as well as only a single snippet generator 52. This nomenclature is for clarity of description only, and the skilled person should understand that the respective services provided by these system elements may be divided across a plurality of physical computing devices. Thus, for example, the network RTK server 30 may be provided by several physical servers working together to provide the service provided by the server. Likewise, multiple different physical computer systems may also cooperate to provide the services given by the PRS decryption server 42, or the snippet generator. Reference to a "server" herein should not, therefore, be taken to mean solely a single stand-alone machine, and can encompass multiple machines working together to provide the service.

Various further modifications may be made to the above described embodiments whether by way of addition, deletion or substitution to provide further embodiments, any and all of which are intended to be encompassed by the appended claims.

The invention claimed is:

1. A method of authenticating a satellite positioning system (SPS) position fix in a SPS receiver, the method comprising:
   receiving at the SPS receiver position fix correction data derived from one or more reference SPS receivers;
   determining a position fix of the SPS receiver using unencrypted open SPS channels transmitted from satellites of the SPS; and
   receiving, by the SPS receiver, authentication data relating to one or more encrypted SPS channels that either authenticates or is used to authenticate the determined position fix without the SPS receiver having to fully decrypt the encrypted SPS channels,
   wherein the method further comprises:
   receiving and sampling the one or more encrypted SPS channels;
   forwarding the sampled encrypted SPS channels data to a decryption server;
   receiving an authentication signal from the decryption server as the authentication data in the event that the decryption server was able to authenticate the encrypted SPS channels data;
   wherein if the encrypted SPS channel data received by the SPS receiver has been authenticated, the SPS receiver may then treat the unencrypted open channel data as authentic.

2. A method according to claim 1, wherein the SPS receiver is not provided with the encrypted SPS channels decryption key.

3. A method according to claim 1, wherein the authentication data and the position fix correction data are received at the SPS receiver from the same service provided by one or more servers.

4. A method according to claim 1, wherein the satellite positioning system (SPS) is a global navigation satellite system (GNSS), and optionally the Galileo system.

5. A method according to claim 1, wherein the satellite positioning system (SPS) is the Galileo GNSS system, and the encrypted secure SPS channels are the Galileo Public Regulated Service (PRS) channels.

6. A SPS receiver comprising a processor arranged to control the receiver to operate in accordance with the method of claim 1.

7. A method of authenticating a satellite positioning system (SPS) position fix in a SPS receiver, the method comprising:
   receiving at the SPS receiver position fix correction data derived from one or more reference SPS receivers;
   determining a position fix of the SPS receiver using unencrypted open SPS channels transmitted from satellites of the SPS;
   receiving, by the SPS receiver, authentication data relating to one or more encrypted SPS channels that either authenticates or is used to authenticate the determined position fix without the SPS receiver having to fully decrypt the encrypted SPS channels, the method further comprising:
   receiving a snippet message that contains data relating to a portion of the encrypted SPS channel decryption codes;

using the received snippet message data to correlate at least part of the encrypted SPS channels, and authenticate the open channels in dependence on the correlation of the encrypted SPS channels using the snippet message data;

wherein when the encrypted SPS channel data received by the mobile SPS receiver has been authenticated, the SPS receiver may then treat the unencrypted open channel data as authentic.

8. A method according to claim 7, wherein the SPS receiver is not provided with the encrypted SPS channels decryption key.

9. A method according to claim 7, wherein the authentication data and the position fix correction data are received at the SPS receiver from the same service provided by one or more servers.

10. A method according to claim 7, wherein the satellite positioning system (SPS) is a global navigation satellite system (GNSS), and optionally the Galileo system.

11. A method according to claim 7, wherein the satellite positioning system (SPS) is the Galileo GNSS system, and the encrypted secure SPS channels are the Galileo Public Regulated Service (PRS) channels.

12. A SPS receiver comprising a processor arranged to control the receiver to operate in accordance with the method of claim 7.

13. A method for use in authenticating a SPS position fix of a SPS receiver, the method comprising:

receiving SPS position fix data from one or more reference SPS receivers;

determining position fix correction data in dependence on the received position fix data;

transmitting to the SPS receiver the position fix correction data; and transmitting to the SPS receiver, authentication data relating to one or more encrypted secure SPS channels that either authenticates or is used to authenticate a position fix determined by the SPS receiver without the SPS receiver having to fully decrypt the encrypted secure SPS channels, wherein the method further comprises:

receiving sampled encrypted SPS channels data from the SPS receiver;

decrypting the encrypted secure SPS channels data;

authenticating the decrypted secure SPS channels data; and sending an authentication signal to the SPS receiver as the authentication data in the event that the decrypted secure SPS channels data was authenticated.

14. A method according to claim 13, wherein the authentication data and the position fix correction data are transmitted to the SPS receiver from the same service provided by one or more servers.

15. A method according to claim 13, wherein the satellite positioning system (SPS) is a global navigation satellite system (GNSS), and optionally the Galileo system.

16. A method according to claim 13, wherein the satellite positioning system (SPS) is the Galileo GNSS system, and the encrypted secure SPS channels are the Galileo Public Regulated Service (PRS) channels.

17. A server or group of servers comprising one or more processors arranged to cause the server or group of servers to operate in accordance with the method of claim 13.

18. A method for use in authenticating a SPS position fix of a SPS receiver, the method comprising:

receiving SPS position fix data from one or more reference SPS receivers;

determining position fix correction data in dependence on the received position fix data;

transmitting to the SPS receiver the position fix correction data; and:

transmitting to the SPS receiver, authentication data relating to one or more encrypted secure SPS channels that either authenticates or is used to authenticate a position fix determined by the SPS receiver without the SPS receiver having to fully decrypt the encrypted secure SPS channels, the method further comprising:

generating a snippet message that contains data relating to a portion of the encrypted SPS channel decryption codes, the data being usable by the SPS receiver to correlate at least part of the encrypted SPS channels and thereby authenticate the open channels in dependence on the correlation;

transmitting the snippet message to the SPS receiver as the authentication data.

19. A method according to claim 18, wherein the authentication data and the position fix correction data are transmitted to the SPS receiver from the same service provided by one or more servers.

20. A method according to claim 18, wherein the satellite positioning system (SPS) is a global navigation satellite system (GNSS), and optionally the Galileo system.

21. A method according to claim 18, wherein the satellite positioning system (SPS) is the Galileo GNSS system, and the encrypted secure SPS channels are the Galileo Public Regulated Service (PRS) channels.

22. A server or group of servers comprising one or more processors arranged to cause the server or group of servers to operate in accordance with the method of claim 18.

23. A method for authenticating a satellite positioning system (SPS) position fix obtained by a mobile SPS receiver, comprising:

using real time kinetic (RTK) or differential SPS (dSPS) correction data from a RTK/dSPS service to obtain a SPS position fix of improved accuracy than otherwise, and receiving from that same RTK/dSPS service authentication data derived from or relating to encrypted SPS channels that the mobile SPS receiver cannot fully decrypt that authenticates whether the position fix determined by the mobile terminal based on the RTK/dSPS correction data can be relied upon, wherein the RTK/dSPS service is an integrated service from which the authentication data and the RTK/dSPS correction data are received in a single integrated transaction.

24. A method for use in authenticating a satellite positioning system (SPS) position fix obtained by a mobile SPS receiver, comprising:

providing real time kinetic (RTK) or differential SPS (dSPS) correction data from a RTK/dSPS service to allow the mobile SPS receiver to obtain a SPS position fix of improved accuracy than otherwise, and providing as part of the same RTK/dSPS service authentication data derived from or relating to encrypted SPS channels that the mobile SPS receiver cannot fully decrypt that authenticates whether the position fix determined by the mobile terminal based on the RTK/dSPS data can be relied upon, wherein the RTK/dSPS service is an integrated service that provides the authentication data and the RTK/dSPS correction data in a single integrated transaction.

* * * * *